Patented Mar. 26, 1935

1,995,291

UNITED STATES PATENT OFFICE 1,995,291

ALKYLENE CARBONATE AND PROCESS OF MAKING IT

Wallace H. Carothers, Wilmington, Del., assignor to E. I. du Pont de Nemours & Company, Wilmington, Del., a corporation of Delaware No Drawing. Application November 12, 1929, Serial No. 406,721

7 Claims. (Cl. 260—54)

This invention relates to esters derived from carbonic acid and glycols of the series $$HO(CH_2)_xOH,$$

where $x$ is greater than 2, and to process of making them.

These compounds may be called alkylene carbonates or polymethylene carbonates, and the first member of this series, ethylene carbonate, has long been known. None of the other members of this series has been described hitherto. I undertook the study of these compounds for the purpose of testing a theory which I conceived concerning reactions of this type. This theory led me to expect that ethylene carbonate should be monomeric (as it was in fact known to be) and that trimethylene carbonate should also be monomeric, but that the higher members of the series should all be polymeric materials of high molecular weight. The preparation and study of these compounds verified this prediction. It also resulted in the discovery that monomeric trimethylene carbonate could be caused to polymerize with the formation of a material of high molecular weight. It also resulted in the discovery that these esters have certain useful properties which are indicated below.

This invention has as an object the preparation of new compositions of matter and has as a further object the use of these new compositions of matter as plastics and in coating compositions.

These objects are accomplished by the following invention which consists in the preparation of these esters by the action of the appropriate glycol on diethyl carbonate or on diphenyl carbonate or on the carbonic ester of any volatile alcohol. The reaction may be catalyzed by the addition of an acid substance such as sulfuric acid or by the addition of an alkaline substance such as sodium ethylate or potassium carbonate. A great many acidic or basic substances have been tried and all of them have been found to be catalysts to a greater or less degree. The reaction may be forced to completion by distilling off the ethyl alcohol or the phenol as it is formed. The following examples are given for the purpose of illustrating the applicability of my invention but are not to be construed in any sense as limitative.

Example I

Trimethylene carbonate may be prepared by warming together in a flask provided with a receiver 60.8 g. of trimethylene glycol and 114 g. of diethyl carbonate to which a small piece of sodium has been added. Warming is continued until solution of the sodium is complete. The flask is then heated in an oil bath during three hours so that the temperature of the bath gradually rises from 130 to 170° C. Ethyl alcohol is distilled off and collects in the receiver. The residue remaining in the flask is dissolved in benzene, and the benzene solution is washed twice with small portions of water and then dried with calcium chloride. The benzene is removed from the solution by distillation, and the residue which remains after the removal of the benzene is distilled under diminished pressure. The trimethylene carbonate solidifies in the receiver. It is soluble in benzene, alcohol, and water; slightly soluble in ether and ligroin. It may be purified by crystallization from ether. When pure it melts at 47–48°. It boils at 160–165° C. at 6 mm. pressure, 135° C. at 4 mm., and 105° C. at 0.2 mm. Its analytical composition and its molecular weight show that it is monomeric trimethylene carbonate,

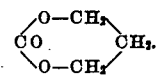

By heating, especially in the presence of catalysts, such as potassium carbonate, monomeric trimethylene carbonate is transformed into a polymeric form of high molecular weight. For example, monomeric trimethylene carbonate is mixed with 0.1% of its weight of potassium carbonate and the mixture is heated to 130° C. After 10 minutes the mixture becomes very viscous, and after five hours heating the material forms on cooling a clear colorless glassy mass. This mass consists essentially of polymeric trimethylene carbonate. On long standing at room temperature it becomes opaque.

Example II

Tetramethylene carbonate may be prepared from 9.0 g. of tetramethylene glycol to which a small piece of sodium has been added, and 11.8 g. of diethyl carbonate. The mixture is heated in a distilling flask provided with a receiver and immersed in an oil bath. The heating is conducted so that the temperature of the oil bath rises gradually from 120° C. to 170° C. during the course of 7 hours. Ethyl alcohol collects in the receiver and the residue remaining in the distilling flask consists essentially of tetramethylene carbonate. It may be purified by dissolving it in benzene, washing the benzene solution with water and removing the benzene by heating, finally in vacuo. The material obtained by this process may be further purified by dissolving it in chloroform and precipitating it with alcohol. It then separates as a powder melting at about 55 to 59° C. It is very soluble in cold benzene, chloroform and acetic acid; very slightly soluble in ether, alcohol and petroleum ether. It is a compound of high molecular weight and cannot be distilled.

*Example III*

Hexamethylene carbonate may be prepared by heating 12 g. of hexamethylene glycol to which a small piece of sodium has been added with 12 g. of diethyl carbonate in a distilling flask. The temperature of the heating bath is gradually raised from 130 to 170° C. during two hours. The residue is dissolved in benzene and washed with water. The benzene is then removed by distillation. The residue on cooling solidified to an opaque, horny, tough elastic mass. It is soluble in benzene, acetone and chloroform; insoluble in ether and alcohol. It is a compound of high molecular weight and cannot be distilled.

*Example IV*

Pentamethylene carbonate prepared by the general method described above is a powder melting at 44–46° C. It is very soluble in benzene, chloroform, acetone and acetic acid; insoluble in ether, alcohol, and petroleum ether. It is a compound of high molecular weight and cannot be distilled.

*Example V*

Decamethylene carbonate prepared by the general method described above is a powder melting at about 55° C. It is very soluble in chloroform; slightly soluble in ether, benzene, acetone and acetic acid; insoluble in alcohol and petroleum ether. It is a compound of high molecular weight and cannot be distilled.

*Example VI*

A mixture of low viscosity pyroxylin base and hexamethylene carbonate or trimethylene carbonate in the proportions 1:1 or 10:3 may be dissolved in a suitable solvent such as a mixture of ethyl acetate, butyl acetate and toluene, or in such a mixture modified by the addition of other components such as cellosolve acetate. The resulting solution may be used as a lacquer. Or, a mixture similar to the above may be further modified by the addition of a gum such as damar. The resulting solution may be used as a lacquer.

It is to be noted that the invention is not limited to the specific methods of preparing the esters which are outlined above, but that these esters may be prepared by any of the typical methods used in the preparation of carbonic esters such, for example, as the action of phosgene on the glycols.

The advantages of this invention lie in the fact that new compositions of matter have been made which find a useful place in the plastic and coating composition arts. Trimethylene carbonate is of particular interest and hexamethylene carbonate is of especial interest because of its toughness and elasticity.

As many apparently widely different embodiments of this invention may be made without departing from the spirit and scope thereof, it is to be understood that I do not limit myself to the specific embodiments thereof except as defined in the appended claims.

I claim:

1. A process which comprises reacting a glycol, of the formula $HO(CH_2)_xOH$ where $x$ is greater than 2, with an esterifying derivative of carbonic acid selected from the class consisting of phosgene, carbonates of volatile alcohols, and carbonates of volatile phenols.

2. A polymeric carbonate of a dihydric primary alcohol of more than two carbon atoms.

3. Substantially neutral esters of carbonic acid with glycols having the formula $HO(CH_2)_xOH$, where $x$ is greater than 2.

4. A substantially neutral polymeric carbonate of a polymethylene glycol having more than two methylene groups.

5. Trimethylene carbonate.

6. Polymerized trimethylene carbonate.

7. Polymerized hexamethylene carbonate.

WALLACE H. CAROTHERS.